United States Patent

Averbuch et al.

[11] Patent Number: 5,619,550
[45] Date of Patent: Apr. 8, 1997

[54] TESTING WITHIN COMMUNICATION SYSTEMS USING AN ARQ PROTOCOL

[75] Inventors: Rod Averbuch, Buffalo Grove; Kamala Urs, Bloomingdale; Israel A. Cimet, Buffalo Grove, all of Ill.

[73] Assignee: Motorola, Inc., Schaumburg, Ill.

[21] Appl. No.: 125,972

[22] Filed: Sep. 23, 1993

[51] Int. Cl.$^6$ .............. H04M 1/24; H04J 1/16; H04B 17/00; G01R 31/28
[52] U.S. Cl. .............. 379/5; 379/2; 379/10; 379/15; 455/67.1; 455/67.4; 370/249; 371/20.4; 371/20.5; 371/32; 371/33
[58] Field of Search .............. 379/1, 2, 5, 6, 379/10, 15, 59; 370/13, 15, 13.1, 14; 455/67.1, 67.4; 371/20.1, 20.4, 20.5, 20.6, 32, 33; 395/182.16, 184.01, 185.01, 185.02

[56] References Cited

U.S. PATENT DOCUMENTS

| | | | |
|---|---|---|---|
| Re. 340,034 | 8/1992 | O'Sullivan | 379/59 |
| 4,268,722 | 5/1981 | Little | 379/59 |
| 4,352,955 | 10/1982 | Kai et al. | 379/59 |
| 4,543,654 | 9/1985 | Jones | 370/60 |
| 4,675,862 | 6/1987 | Banzi | 379/5 |
| 4,698,839 | 10/1987 | DeVaney | 379/59 |
| 4,860,281 | 8/1989 | Finley et al. | 379/5 |
| 4,885,740 | 12/1989 | Parson | 371/33 |
| 4,918,623 | 4/1990 | Lockitt | 379/6 |
| 4,924,456 | 5/1990 | Maxwell | 375/8 |
| 4,939,731 | 7/1990 | Reed | 371/32 |
| 4,947,317 | 8/1990 | DiGiulio | 371/32 |
| 4,984,290 | 1/1991 | Levine | 379/60 |
| 5,060,226 | 10/1991 | Gewin | 370/15 |
| 5,121,391 | 6/1992 | Paneth | 379/59 |
| 5,257,397 | 10/1993 | Barzegar | 379/59 |
| 5,265,089 | 11/1993 | Yonehara | 370/15 |
| 5,265,103 | 11/1993 | Brightwell | 371/33 |
| 5,313,473 | 5/1994 | Darmon | 371/35 |

*Primary Examiner*—Curtis Kuntz
*Assistant Examiner*—Vijay Shankar
*Attorney, Agent, or Firm*—Susan L. Lukasik

[57] ABSTRACT

An apparatus for and method of testing the components of a communication system that uses an ARQ protocol is provided. A processor (117) within the communication system is designated to emulate the ARQ protocol so that the normal paths of communication through the system are tested by creating a path (405) that isolates components (103 and 105) from the remainder of the system and tests the remaining components (107 and 109) using the ARQ-emulating processor (117). The processor (117) is also used to emulate a second protocol.

9 Claims, 3 Drawing Sheets

TESTING WITHIN COMMUNICATION SYSTEMS USING AN ARQ PROTOCOL

FIELD OF THE INVENTION

This invention relates to communication system testing, including but not limited to testing of communication system components using a particular protocol.

BACKGROUND OF THE INVENTION

A number of techniques for controlling errors in communication transmissions exist. One such technique is an automatic-repeat-request (ARQ) scheme. A code with good error-detecting capability is used in an ARQ scheme. The receiver attempts to detect errors according to its error-detection mechanism. Data is segmented into numbered packets. If no errors are detected in a packet of data, the receiver assumes that the packet is error-free, and the receiver accepts the packet, and via a return channel, informs the transmitter that the packet was successfully received and identifies the packet by number. If errors are detected in the packet of data, the receiver, via the return channel, informs the transmitter and requests retransmission of the packet by number. This process of transmission, informing, and retransmission continues until an entire message is successfully received.

Occasionally, a communication system fails, and it becomes necessary to repair or test it. A common, if not indispensable, tool used to test and/or debug a communication system is a loopback, which isolates portions of the communication system from the remainder of the system. The remaining part of the system is tested through the loopback path, by sending known test patterns through the path, and checking to be sure that the data matches the pattern at each part of the path. When a path tests out successfully, the fault is determined to exist in the isolated portion of the system.

An ARQ system breaks down and fails to function properly if the return channel is disturbed or cut-off, because the transmitter and receiver must maintain constant communication to insure that all message packets are received to the satisfaction of the receiver. Without this duplex system, no data is successfully transferred. Thus, an ARQ system cannot operate in a simplex or one way only mode. Consequently, if a fault occurs in a system with an ARQ protocol, it is impossible to test the data by sending a test pattern, as such a pattern will cause the ARQ protocol to break down and no information will be successfully transferred. Testing is effectively impossible.

An ARQ system breaks down and fails to function properly if the return channel is disturbed or cut-off, because the transmitter and receiver must maintain constant communication to insure that all message packets are received to the satisfaction of the receiver. Without this duplex system, no data is successfully transferred. Thus, an ARQ system cannot operate in a simplex or one way only mode. Consequently, if a fault occurs in a system with an ARQ protocol, it is impossible to test the data by sending a test pattern, looping it back in the system, and returning the data back to the same entity. Such a pattern will cause the ARQ protocol to break down and no information will be successfully transferred. Testing in this manner is effectively impossible.

Accordingly, there is a need for a method of testing a system that utilizes an ARQ protocol.

2

BRIEF DESCRIPTION OF THE DRAWINGS

FIG. 1 is a block diagram of a communication system in accordance with the invention.

FIG. 4-1, FIG. 4-2, FIG. 4-3, and FIG. 4-4 each show a block diagram of a test path for a particular system component in accordance with the invention.

DESCRIPTION OF A PREFERRED EMBODIMENT

The following describes an apparatus for and method of testing the components of a communication system that uses an ARQ protocol. A processor within the communication system is designated to emulate the ARQ protocol so that the normal paths of communication through the system are tested by creating a path that isolates components from the system and tests the remaining components using the ARQ-emulating processor. The processor is also used to emulate a second protocol.

A method of testing is provided for a plurality of components of an infrastructure of a communication system that uses an automatic-repeat-request (ARQ) protocol that is terminated in at least one communication unit and a first processor within the infrastructure. A test processor is provided within the infrastructure. A component is chosen from the plurality of components for testing. A duplex loopback is formed that separates the chosen component from each of the plurality of components that is between the chosen component and the at least one communication unit in the communication system. The ARQ protocol is emulated by the test processor. The chosen component is tested by transmitting data in accord with the ARQ protocol from the first processor to the test processor through the duplex loopback. As an additional feature, the test processor emulates a second protocol, and the chosen component is tested by transmitting data in accord with the second protocol from the first processor to the test processor through the duplex loopback. The second protocol may facilitate data transfer to a Public Switched Telephone Network.

Figures 1, 4:
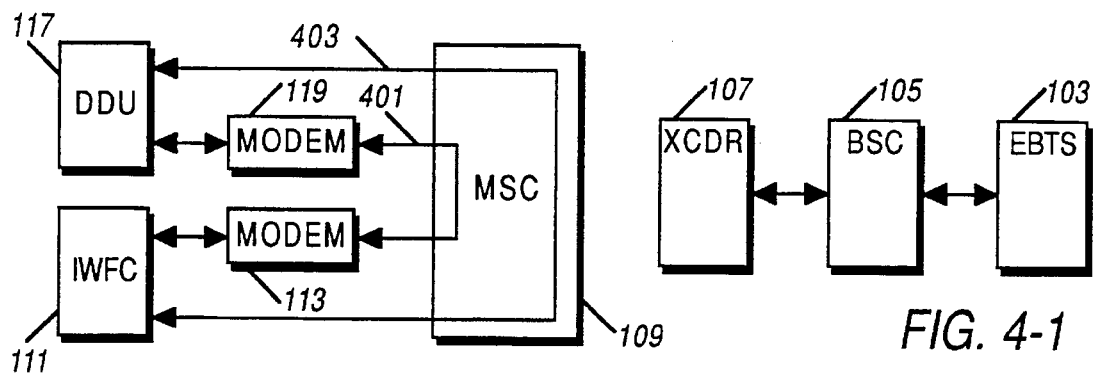
Figures 2, 4:
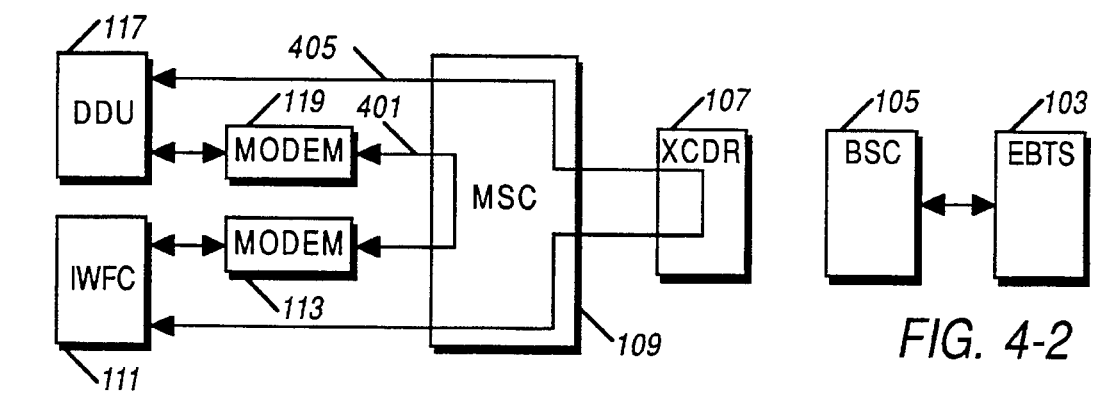
Figures 3, 4:
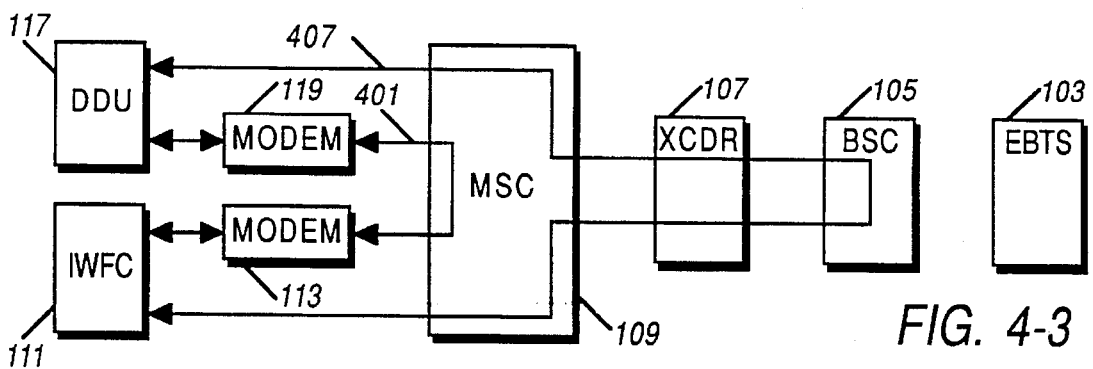
Figure 4:
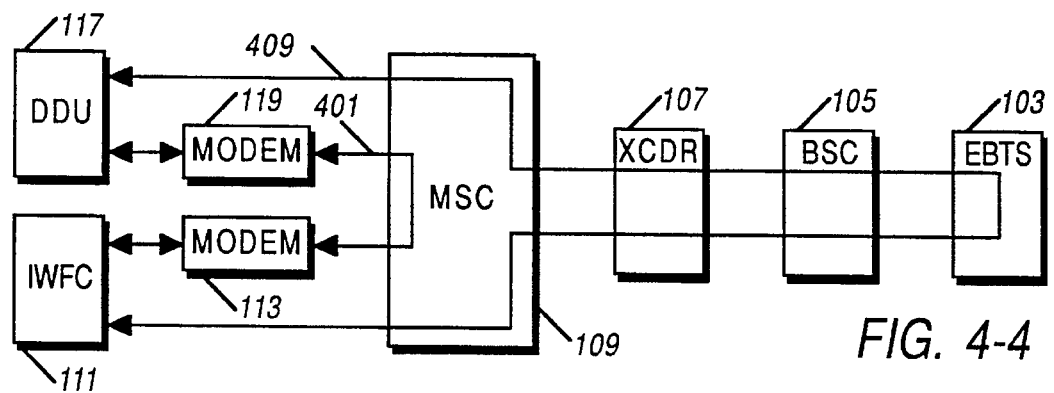

A block diagram of a communication system is shown in FIG. 1, including a mobile communication unit (mobile) 101 and a communication system infrastructure 103, 105, 107, and 109, which transfers data between the mobile 101 and a public switched telephone network (PSTN) 115. In this system, information is transferred from the mobile 101 to the PSTN 115 via various radio frequency and wireline channels. The mobile 101 transmits data via a radio frequency channel to an EBTS 103 (Enhanced Base Tranceiver Station). The EBTS processes the information by disassembling the air frame and transfers the resultant data to a base station controller (BSC) 105. The BSC 105 transfers data to the transcoder (XCDR) 107, which operates in both data and voice mode to de compress the voice and rate adapt the data. The transcoder 107 outputs the data to a master switch (MSC) 109, which directs the data to the proper place. Data from the transcoder 107 goes through the MSC 109 via digital links (as shown by the line labelled ARQ) and into the IWFC (interworking function controller) 111. The output of the IWFC 111 is input to a modem 113 for transfer to the PSTN 115 through the MSC 109. Information is transferred in the opposite direction by reversing the process. The IWFC 111 and modem 113 together form an IWF (interworking function) 121. A second IWF 123, comprised of a second IWFC 117 and a second modem 119, is also shown in FIG. 1. The function of the second IWF 123 is the same as the first IWF 121 except that each IWF operates on different channels. The second IWF 123 is not in use at the time shown in the drawing. The IWF 121 OR 123 terminates the ARQ protocol initiated by the mobile 101 and converts the data to a second protocol that facilitates data transfer to the PSTN 115. Although only two IWFs are shown in FIG. 1, the preferred embodiment actually uses multiple IWFs to perform the same function for numerous channels. Only two are shown for ease of drawing and explanation. If there are more IWFs, they are connected in parallel, as are the IWFs 121 and 123 shown in FIG. 1.

Figure 2:
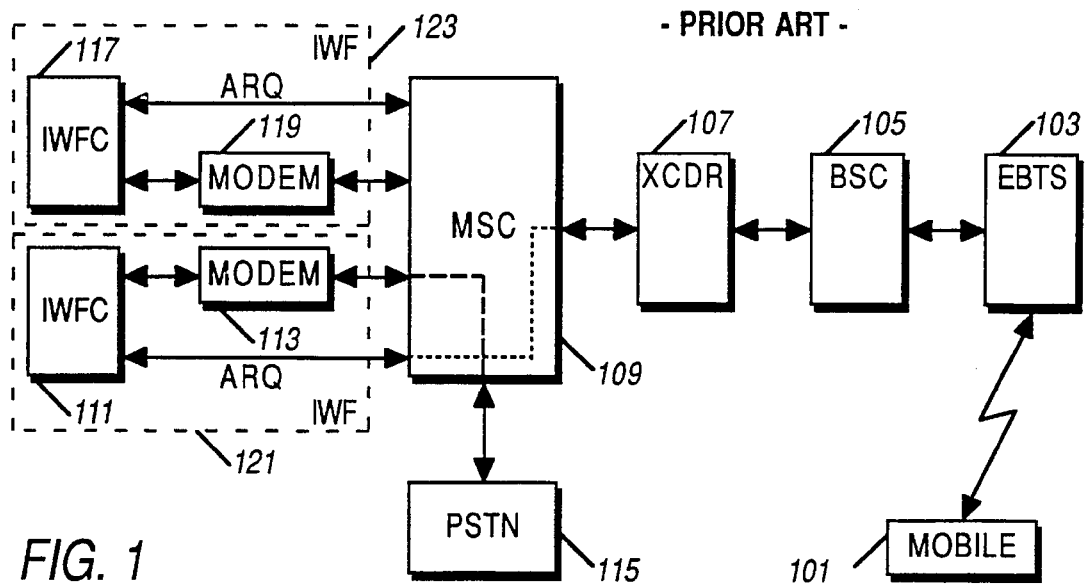
FIG. 2 is a block diagram of a communication system with a data diagnostic unit in accordance with the invention.
Figure 2:
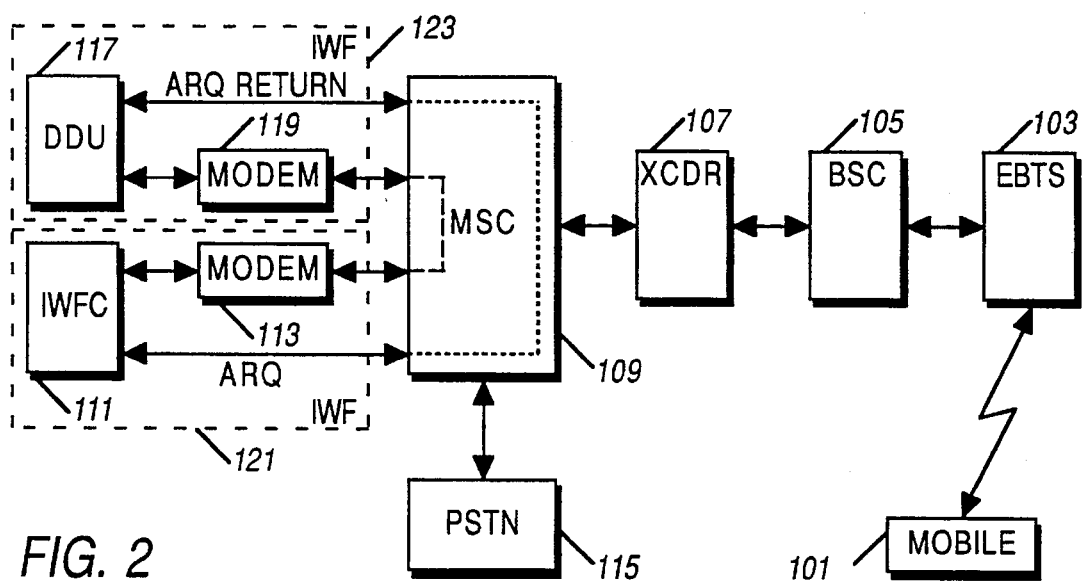

A block diagram of a communication system with a data diagnostic unit is shown in FIG. 2. The components of the communication system of FIG. 2 are the same components as those in the communication system of FIG. 1, except the second IWFC 117 is converted to a data diagnostic unit (DDU) 117. The function of the DDU 117 is to emulate the ARQ protocol and the PSTN return path as if the DDU 117 was a mobile communication unit and PSTN combined. In order to test an ARQ protocol, it is necessary to have data that is traded between two sides. This data is normally transmitted to the mobile, but without data being transferred continuously on both sides, it is impossible to cut off one side while still maintaining integrity on the other side because the integrity of the first side requires information from the second side for an ARQ protocol. When testing a system, it is common place to isolate a component from the remainder of the system that is down stream from the part being tested. If such isolation occurs, obviously, the mobile unit, which terminates the ARQ protocol, will not sending information back to the IWF and therefore it will be impossible to test the IWF because there is no return information coming. Thus, in the preferred embodiment, a DDU 117 is selected from amongst the IWFCs that are currently in the IWF. This DDU 117 emulates the ARQ protocol in such a way that any duplex loopback isolating any number of components from the mobile will create a good termination for the ARQ protocol as if the mobile were actually still in the system. Thus, it is possible to test any part of the system by sending information in accord with the ARQ protocol through the components and to the DDU without the IWFC knowing any different.

Figure 3:
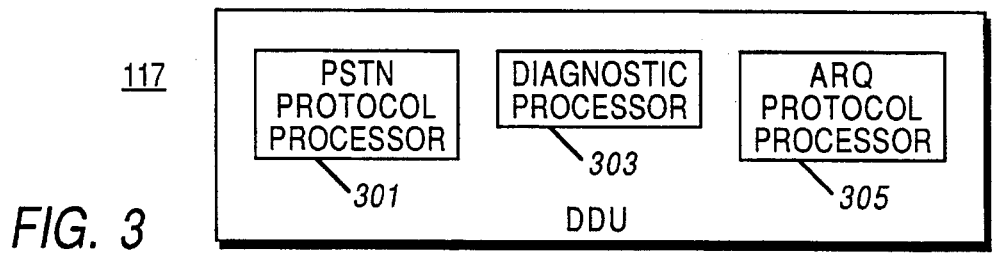
FIG. 3 is a block diagram of a data diagnostic unit in accordance with the invention.

A block diagram of a data diagnostic unit 117 is shown in FIG. 3. In the preferred embodiment, the DDU 117 uses the same hardware as an IWFC in order to conserve space and cost. In the preferred embodiment, an IWFC contains a microprocessor, which terminates the ARQ protocol from the mobile 101 and converts the data to a protocol that facilitates data transfer to the PSTN 115. The microprocessor is reprogrammed to perform as a DDU when it is assigned to be a DDU. In the preferred embodiment, the microprocessor performs three functions as a DDU: a PSTN protocol processor 301, a diagnostic processor 303, and an ARQ protocol processor 305. The PSTN protocol processor 301 performs the functions of controlling the PSTN data modem 119 and any FAX modem which may be present, thereby providing a second protocol that facilitates data transfer to the PSTN. The diagnostic processor 303 performs the function of testing of components in the system infrastructure through a path using the ARQ protocol between the DDU 117 and the IWFC 111 that processes data in accord with the ARQ protocol, wherein the path goes through any number components in the infrastructure. Examples of such paths are shown in FIG. 4-1, FIG. 4-2, FIG. 4-3, and FIG. 4-4. For example, the diagnostic processor may compare the data that was sent from the IWFC with the received data in the DDU's 117 ARQ processor 305 for bit error rate testing of a specific network entity or link. The ARQ protocol processor 305 performs the function of terminating the ARQ protocol, and processing data in accord with the ARQ protocol, which is initiated in the first IWF 121. Although FIG. 3 appears to show these functions as three separate processors, FIG. 3 is a logical implementation, and the DDU 117 need not be implemented as three separate processors, but as rather as three separate functions in a single processor, as is done in the preferred embodiment. Such a distinction is merely an implementation choice and does not affect the success of the present invention.

A block diagram of a test path for a particular system component is shown in FIG. 4-1, FIG. 4-2, FIG. 4-3, and FIG. 4-4. FIG. 4-1 shows selection of the MSC as the component to be tested. The transcoder 107, BSC 105, and EBTS 103 are isolated from the MSC 109, and the duplex loopback goes through the MSC 109, where the ARQ protocol goes through path 403, and the PSTN protocol goes through path 401. FIG. 4-2 isolates the transcoder 107 from the BSC 105 and EBTS 103. In this instance, the PSTN path 401 remains the same, and the ARQ protocol path is path 405. FIG. 4-3 shows the BSC 105 as the component to be tested, and the duplex loopback isolates the EBTS 103 from the remainder of the network. As before, the PSTN path is path 401 and the ARQ path is path 407, which goes from the IWFC 111 through the MSC 109 to the transcoder 107 to the BSC 105 back through the transcoder 107 through the MSC 109 and then to the DDU 117. Similarly, in FIG. 4-4, the EBTS 103 is the component that is selected to be tested and because it is the last component in line in the infrastructure, it is isolated from no other part of the infrastructure. The PSTN path is again 401, and the ARQ path 409 goes from the IWFC 111 to the MSC 109 to the transcoder 107 to the BSC 105 to the EBTS 103 back to the BSC 105 to the transcoder 107 to the MSC 109 and to the DDU 409 on the ARQ return path.

Figure 5:
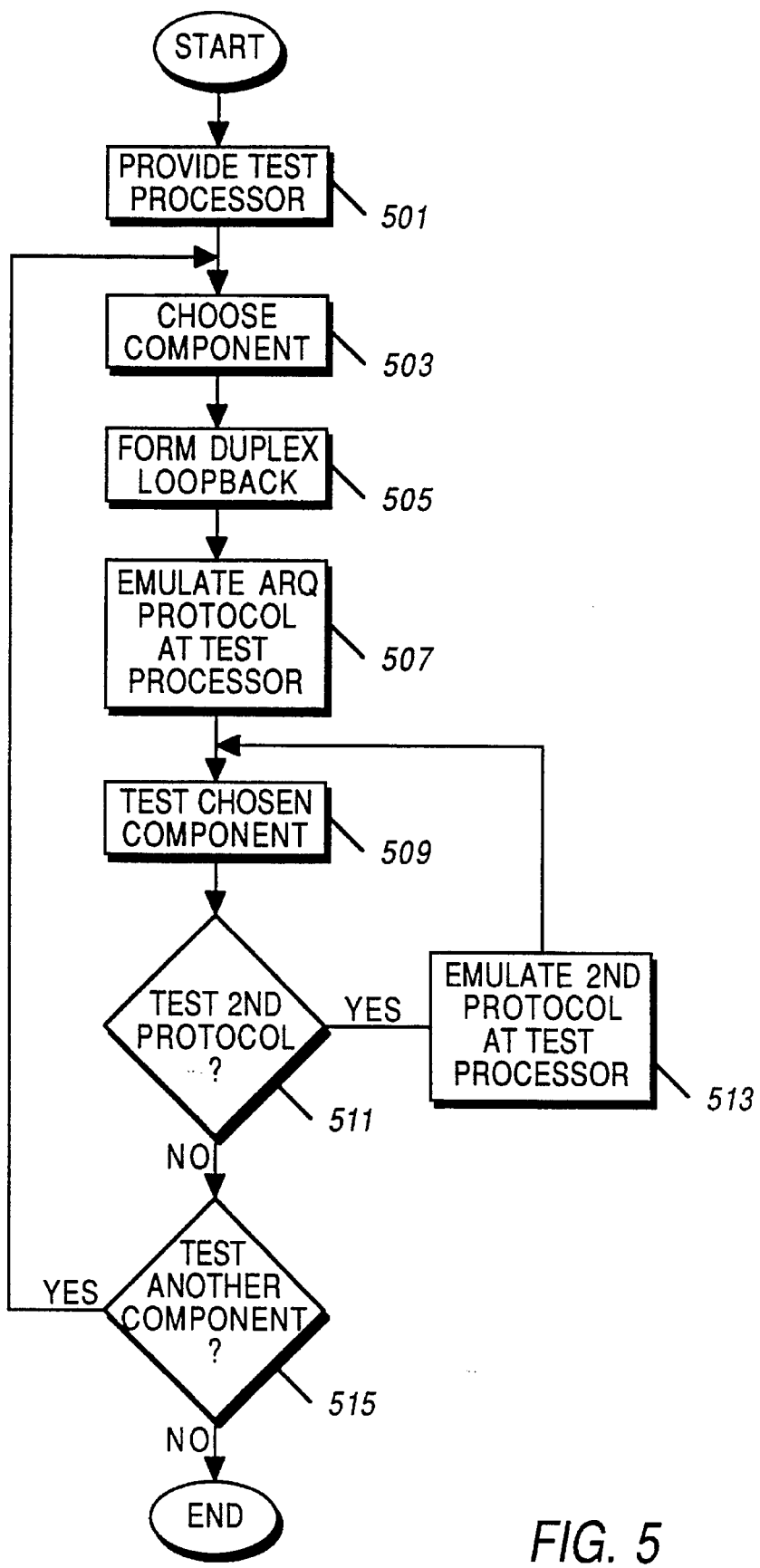
FIG. 5 is a flowchart showing component testing in accordance with the invention.

A flowchart showing component testing is shown in FIG. 5. At step 501, a test processor is provided, where one of the IWFs is chosen to perform as the DDU 117. At step 503, a component is chosen to be tested. This component may be the MSC 109, the transcoder 107, the BSC 105, or the EBTS 103 in the present invention. At step 505, a duplex loopback is formed. In the preferred embodiment, the loopbacks among the system components are initiated by messages from an OMC (Operational and Maintenance Controller, not shown). In the preferred embodiment, the OMC is responsible for all testing activities in the radio network. Successful use of the present invention need not use an OMC to perform these functions. The duplex loopback isolates all components of the infrastructure between that component and the part of the infrastructure that directly communicates with the mobile unit. See FIG. 4 for more information on component isolation. At step 507, the DDU 117, also known as the test processor, emulates the ARQ protocol and thereby terminates the protocol between with the other IWFC 111. At step 509, the chosen component is tested in accord with any test procedure which is deemed appropriate. At step 511, it is determined if a second protocol is to be tested. If a second protocol is to be tested, that second protocol such as the PSTN protocol, is emulated at the test processor, DDU 117, at step 513. At which point, the procedure continues with step 509. If at step 511 a second protocol is not to be tested, then the procedure continues with step 515. At step 515, it is determined if another component is to be tested in this system. If another component is to be tested in the system, then the process continues with step 503 where another component is chosen, and if another component is not to be tested, then the procedure ends.

Although the preferred embodiment shows a particular communication system, the present invention may be applied to any system that has an ARQ protocol and any number or type of components. Three or more protocols may also be tested by applying the method and apparatus that are within the spirit of the invention.

The advantage of this approach is the ability to test and isolate parts of a complex network, such as radio telephone network, that utilizes an ARQ protocol between remote entities. Using a DDU in the manner described above eliminates the need for complex network test points for protocol monitoring, which is a common practice of network testing.

What is claimed is:

1. A method of testing a plurality of components of an infrastructure of a communication system that uses an automatic-repeat-request (ARQ) protocol that is terminated in at least one communication unit and a first processor within the infrastructure, comprising the steps of:

providing a test processor within the infrastructure;

choosing a component from the plurality of components for testing;

forming a duplex loopback that separates the chosen component from each of the plurality of components that is between the chosen component and the at least one communication unit in the communication system;

emulating the ARQ protocol by the test processor; and testing the chosen component by transmitting data in accord with the ARQ protocol between the first processor and the test processor through the duplex loopback.

2. The method of claim 1, wherein the test processor emulates a second protocol, further comprising the step of testing the chosen component by transmitting data in accord with the second protocol from the first processor to the test processor, wherein the second protocol is not the same as the ARQ protocol.

3. The method of claim 2, wherein the second protocol facilitates data transfer to a Public Switched Telephone Network.

4. An apparatus comprising:

a first processor for processing data in accord with an automatic-repeat-request (ARQ) protocol within a communication system comprised of a plurality of components, wherein the ARQ protocol is terminated in at least one communication unit;

a test processor, arranged and constructed to emulate the ARQ protocol;

a diagnostic processor, operatively coupled to the first processor, arranged and constructed to form a duplex loopback that separates a chosen component from each of the plurality of components that is between the chosen component and the at least one communication unit in the communication system, and to test a path between the first processor, the chosen component, and the test processor by transmitting data in accord with the ARQ protocol between the first processor and a test processor through the duplex loopback.

5. The apparatus of claim 4, further comprising:

a third processor, operatively coupled to the first processor, for processing data in accord with a second protocol;

wherein the diagnostic processor tests use of the second protocol and wherein the second protocol is not the same as the ARQ protocol.

6. The system of claim 5, wherein the second protocol facilitates data transfer to a Public Switched Telephone Network.

7. A system comprising:

a first processor for processing data in accord with an automatic-repeat-request (ARQ) protocol within a communication system comprised of a plurality of components, wherein the ARQ protocol is terminated in at least one communication unit;

a test processor, arranged and constructed to emulate the ARQ protocol;

a diagnostic processor, operatively coupled to the test processor, arranged and constructed to form a duplex loopback that separates a chosen component from each of the plurality of components that is between the chosen component and the at least one communication unit in the communication system, and to test a path between the first processor, the chosen component, and the test processor by transmitting data in accord with the ARQ protocol between the first processor and the test processor through the duplex loopback, wherein the path goes through any number of the plurality of components.

8. The system of claim 7, further comprising:

a third processor, operatively coupled to the first processor, for processing data in accord with a second protocol; and a fourth processor, operatively coupled to the second processor, for processing data in accord with the second protocol;

wherein the diagnostic processor tests use of the second protocol and wherein the second protocol is not the same as the ARQ protocol.

9. The system of claim 8, wherein the second protocol facilitates data transfer to a Public Switched Telephone Network.

* * * * *